US012717857B2

(12) United States Patent
Peshwa et al.

(10) Patent No.: US 12,717,857 B2
(45) Date of Patent: Aug. 25, 2026

(54) ARTIFICIAL INTELLIGENCE FOR FACILITATING SERVICE FROM DIGITAL ENVIRONMENT

(71) Applicant: Truist Bank, Charlotte, NC (US)

(72) Inventors: Mihika Peshwa, Charlotte, NC (US); Zjaden Hinson, Charlotte, NC (US); Genny Aliff, Atlanta, GA (US); Jeriko Geneta, Jacksonville, FL (US); Aniekanabasi Asanga, Charlotte, NC (US); Timothy Pittman, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 18/916,828

(22) Filed: Oct. 16, 2024

(65) Prior Publication Data

US 2026/0106915 A1 Apr. 16, 2026

Related U.S. Application Data

(63) Continuation of application No. 18/916,800, filed on Oct. 16, 2024.

(51) Int. Cl.

| | |
|---|---|
| ***H04L 67/306*** | (2022.01) |
| ***G06Q 10/40*** | (2026.01) |
| ***G06Q 10/42*** | (2026.01) |
| ***G06Q 10/44*** | (2026.01) |
| ***G06Q 10/46*** | (2026.01) |

(Continued)

(52) U.S. Cl.
CPC ........... *H04L 67/306* (2013.01); *G06Q 10/40* (2026.01); *G06Q 10/42* (2026.01); *G06Q 10/44* (2026.01); *G06Q 10/46* (2026.01); *G06Q 10/48* (2026.01); *H04L 63/08* (2013.01)

(58) Field of Classification Search
CPC ....... H04L 67/306; H04L 63/08; G06Q 50/01; G06Q 10/40; G06Q 10/42; G06Q 10/44; G06Q 10/46; G06Q 10/48
See application file for complete search history.

(56) References Cited

U.S. PATENT DOCUMENTS

| | | | | |
|---|---|---|---|---|
| 2018/0165590 | A1* | 6/2018 | Vlassis | G06N 5/045 |
| 2019/0327331 | A1* | 10/2019 | Natarajan | G06F 9/4451 |
| 2020/0394721 | A1* | 12/2020 | Gonzalez | G06Q 50/26 |

(Continued)

*Primary Examiner* — Kavita Stanley
*Assistant Examiner* — Lin Lin M Htay
(74) *Attorney, Agent, or Firm* — Kilpatrick Townsend & Stockton LLP; Michael A. Springs, Esq.

(57) ABSTRACT

A system can be used to facilitate service from a digital environment. The system can receive input data associated with a user account from a digital environment. The digital environment may be provided to the user account via an application executable on a mobile computing device. The system can apply an artificial intelligence model to the input data and the user account to generate recommendations for service to an entity associated with the user account. The artificial intelligence model can be applied to the input data and the user account to determine services to be included in the recommendations. The system can provide the recommendations for service to the entity via the digital environment. The system can control an interaction involving the entity based on received input that indicates selection of a service included in the recommendations for service.

19 Claims, 7 Drawing Sheets

(51) Int. Cl.
*G06Q 10/48* (2026.01)
*H04L 9/40* (2022.01)

(56) References Cited

U.S. PATENT DOCUMENTS

2022/0179665 A1* 6/2022 Rathod .................. G06F 9/451
2022/0198779 A1* 6/2022 Saraee ............... G06F 16/9535

* cited by examiner

ARTIFICIAL INTELLIGENCE FOR FACILITATING SERVICE FROM DIGITAL ENVIRONMENT

CROSS-REFERENCE TO RELATED APPLICATIONS

The present application is a continuation of U.S. application Ser. No. 18/916,800, filed Oct. 16, 2024, titled "ARTIFICIAL INTELLIGENCE FOR FACILITATING SERVICE FROM DIGITAL ENVIRONMENT," the entirety of which is incorporated herein by reference.

TECHNICAL FIELD

The present disclosure relates to machine-learning and, more particularly (although not necessarily exclusively), to artificial intelligence techniques that can be used to facilitate service from a digital environment.

BACKGROUND

Interactions can take place between entities in a variety of ways. For example, digital interactions are increasingly being performed between entities that may have interest in participating in an interaction. A digital interaction may be or include an interaction between two or more entities that at least originates online or otherwise originates from a digital medium. Facilitating interactions from a digital environment may be difficult. For example, being able to predict, initiate, execute, or a combination thereof one or more interactions that may interest one or more entities may be difficult.

SUMMARY

In some examples, a system can include a processor and a memory including instructions that can be executed by the processor to cause the processor to perform various operations. The system can receive input data associated with a particular user account from a digital environment. The digital environment can be provided to the particular user account via an application that can be executed on a mobile computing device. The system can apply an artificial intelligence model to the input data and the particular user account to generate one or more recommendations for service to an entity associated with the particular user account. The artificial intelligence model can be applied to the input data and the particular user account to determine one or more services to be included in the one or more recommendations, and the one or more services can have one or more likelihoods for being used by the entity. Each likelihood of the one or more likelihoods may exceed a threshold likelihood. The system can provide the one or more recommendations for service to the entity via the digital environment. The system can control an interaction involving the entity based on received input that indicates selection of a particular service of the one or more services included in the one or more recommendations for service.

In additional examples, a method involving artificial intelligence can be used to facilitate service from a digital environment. The method can include receiving input data associated with a particular user account from a digital environment. The digital environment can be provided to the particular user account via an application executing on a mobile computing device. The method can include applying an artificial intelligence model to the input data and the particular user account to generate one or more recommendations for service to an entity associated with the particular user account. The artificial intelligence model can be applied to the input data and the particular user account to determine one or more services to be included in the one or more recommendations. The one or more services can have one or more likelihoods for being used by the entity, and each likelihood of the one or more likelihoods can exceed a threshold likelihood. The method can include providing the one or more recommendations for service to the entity via the digital environment. The method can include controlling an interaction involving the entity based on received input that indicates selection of a particular service of the one or more services included in the one or more recommendations for service.

In additional examples, a non-transitory computer-readable medium can include program code that can be executed by a processing device to cause the processing device to perform various operations. The operations can include receiving input data associated with a particular user account from a digital environment. The digital environment can be provided to the particular user account via an application that can be executed on a mobile computing device. The operations can include applying an artificial intelligence model to the input data and the particular user account to generate one or more recommendations for service to an entity associated with the particular user account. The artificial intelligence model can be applied to the input data and the particular user account to determine one or more services to be included in the one or more recommendations. The one or more services can have one or more likelihoods for being used by the entity, and each likelihood of the one or more likelihoods can exceed a threshold likelihood. The operations can include providing the one or more recommendations for service to the entity via the digital environment. The operations can include controlling an interaction involving the entity based on received input that indicates selection of a particular service of the one or more services included in the one or more recommendations for service.

DETAILED DESCRIPTION

Figure 1:
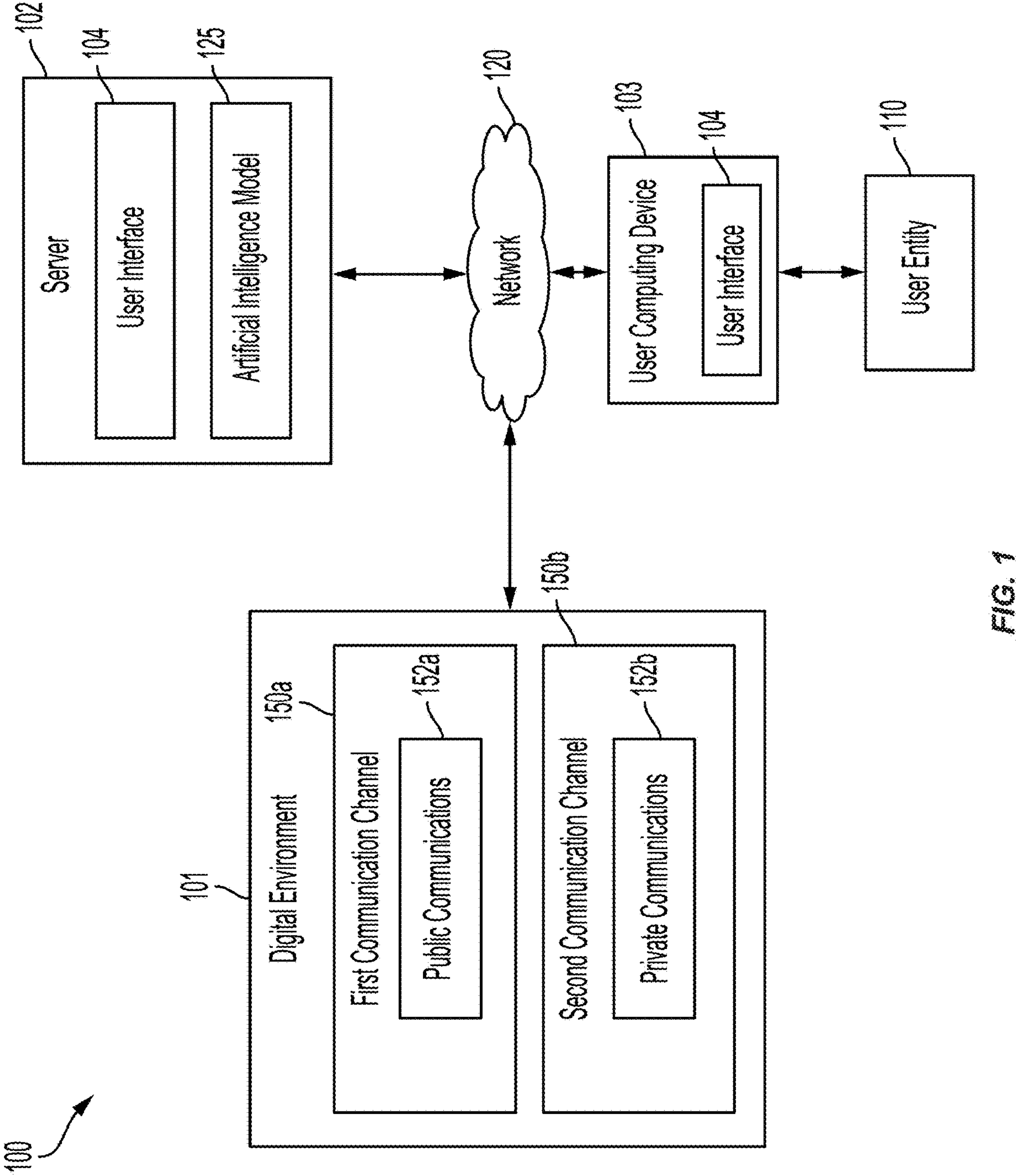
FIG. 1 is a block diagram of an example of a computing environment including a digital environment for facilitating service using artificial intelligence according to some implementations of the present disclosure.

Certain aspects and features relate to using artificial intelligence to facilitate service from a digital environment. Additionally or alternatively, the artificial intelligence may be used to customize the digital environment. The digital environment may be or include a social network or other suitable application that can be provided by a provider entity and that can be provided via an application that can execute on a mobile computing device or other suitable computing device. In some examples, the digital environment may be a specific type of social network that caters to a particular type of user entity or a particular type of account that can be provided by the provider entity. The provider entity can be any suitable provider that can provide services and the digital environment. For example, the provider entity may generate and provide access, such as via one or more user accounts, to the digital environment, and the provider entity may offer services that can be facilitated by a user entity using the digital environment. The artificial intelligence may be or include an artificial intelligence model, such as a machine-learning model, a generative artificial intelligence model, or other suitable artificial intelligence model, that can be used to facilitate service from the digital environment, that can be used to customize the digital environment, or that can be used for other purposes. In some examples, the artificial intelligence model can be or include a large language model that can receive input from the digital environment and that can provide outputs that include recommendations for service to provide for a user entity. Facilitating the service may involve transmitting a message via a user account to notify the user entity that the service is available and is relevant to the user entity, may involve automatically initiating the service based on a history of usage of the user account, etc.

A digital environment may be or include an interactive computing environment that may be selectively accessible to one or more users. For example, the digital environment may be or include a social networking application that can be accessed via a mobile computing device or via other suitable computing devices such as personal computers. A provider entity, such as via a server computer or server system, may host the digital environment and may otherwise control access to the digital environment. For example, the provider entity may selectively issue user accounts to one or more user entities in which the user accounts can be used for accessing the digital environment. The provider entity may determine to issue a user account for a particular type of user entity or for a user entity that holds a particular type of separate user account with the provider entity. The issued user account can be used to access the digital environment to interact with other users having issued user accounts, to interact with, or be interacted with by, the provider entity via the digital environment, or for a combination thereof. In some examples, a user entity may log into the issued user account, and, upon authentication by the provider entity or the server thereof, the user entity may post one or more questions or comments via the digital environment, the user entity may interact with previously asked questions or comments, the user entity may view content generated or provided by the provider entity, or any combination thereof.

In some examples, the digital environment may have or provide multiple different communication channels. The multiple different communication channels may include one or more public communication channels, one or more private communication channels, other suitable communication channels, or any combination thereof. The one or more public communication channels can include a streaming content feed that provides posts, questions, comments, or the like on a scrolling screen. A user entity that can access the digital environment may transmit a communication to, such as post a question on, be published via the one or more public communication channels, and any user entity that has been authenticated can access, view, and potentially interact with the communication. The one or more private communication channels can include communication channels specific to each user entity that can access the digital environment. For example, the digital environment may include a sub-page or a link to private messaging that may be encrypted or otherwise not accessible to other user entities. That is, the one or more private communication channels may be specific to a particular user entity and may not be accessible until the user entity is authenticated via the user account.

Additionally or alternatively, the communication channels provided via the digital environment may be one-way communication channels, two-way communication channels, or more than two-way communication channels, which can include communication channels facilitating communication between more than three entities. An example of a more than two-way communication channel can include the one or more public communication channels that can include a streaming content feed that provides posts, questions, comments, or the like on a scrolling screen. In the more than two-way communication channel, more than two entities may communicate with each other in real-time or otherwise without waiting for additional authentication or messages. For example, a question posted on the more than two-way communication channel can be interacted with by five entities, ten entities, 20 entities, or more entities such as via commenting, voting, or the like. An example of a two-way communication channel can include the one or more private communication channels. The two-way communication channel can be or include a messaging page or feature of the digital environment that may allow two entities to communicate with each other without any other entities. In some examples, the messaging page or feature of the digital environment may allow more than two entities to privately communicate with one another. An example of a one-way communication channel can include a learning sub-page or a content sub-page in which content can be provided by the provider entity to a user entity. The content may be generated or otherwise produced by the provider entity, and the provider entity may selectively present the content to the user entity via a sub-page of the digital environment. In this way, the provider entity may have a one-way communication channel to communicate content to the user entity without allowing or otherwise having the user entity communicate with the provider entity.

The provider entity, or any computing device or system associated therewith, can use the digital environment to facilitate service for a user entity. For example, the system can include or otherwise have access to an artificial intelligence model that can facilitate the service. The system can continuously or periodically monitor the digital environment to receive input from the user entity. For example, each communication generated by the user entity and transmitted via the digital environment can be received by the system, and the system can use each communication generated by the user entity and transmitted via the digital environment as input into the artificial intelligence model to facilitate the service. In some examples, the artificial intelligence model can be or include a large language model that can generate natural language output based on natural language input. The large language model can receive the input from the digital environment and can generate outputs that can include recommendations for particular services that the user entity may be likely to use, from which the user entity may be likely to benefit, for which the user entity may be likely to qualify, etc. The large language model may be trained using one or more training datasets that include natural language examples including each service that may be provided by the provider entity. In some examples, the trained large language model may be configured to map input communications from the digital environment to the most likely or most relevant services provided by the provider entity. In a particular example, the provider entity may provide an online account security service, and the user entity may transmit a communication about enhancing security of a separate online account. The system may use the large language model to determine the intent of the communication and to generate a second communication that includes natural language indicating an offer from the provider entity to provide the online account security service for the user entity. The second communication may be provided via the digital environment. In some examples, the second communication can be provided via a common communication channel of the digital environment, via a separate communication channel of the digital environment, or via a combination thereof.

The techniques described herein may improve one or more technical fields. For example, the techniques described herein improve the technical field of information security at least since various communication channels are provided via the digital environment, and each communication channel has different and specific security controls such as authentication processes to prevent unintended disclosure of information, resources, or the like. Additionally or alternatively, the techniques described herein improve the technical field of artificial intelligence predictions. The artificial intelligence model may be continuously or periodically trained using data gleaned from public communication channels of the digital environment, from private communication channels of the digital environment, or from a combination thereof. By training the artificial intelligence model using the data, which is not available using other techniques or systems, gleaned from the digital environment, predictions from the artificial intelligence model are more accurate and useful than predictions from other artificial intelligence models.

These illustrative examples are given to introduce the reader to examples of the general subject matter discussed here and are not intended to limit the scope of the disclosed concepts. In the following description, for the purposes of explanation, specific details are set forth in order to provide a thorough understanding of various implementations and examples. Various implementations may be practiced without these specific details. The figures and description are not intended to be restrictive.

FIG. 1 is a block diagram of an example of a computing environment 100 including a digital environment for facilitating service using artificial intelligence according to some implementations of the present disclosure. In some examples, the computing environment 100 can be used to facilitate service using artificial intelligence, and the computing environment 100 may improve (i) data security by monitoring digital interaction requests and progress for unauthorized or unsuccessful previously executed interactions and (ii) interaction initiation accuracy by providing customizable user interface such as user interface 104. The services provided by, controlled, or otherwise facilitated by server 102 can be associated with one or more entities, such as users, organizations, devices, and the like.

In some examples, the computing environment 100 can include a digital environment 101, the server 102, a user computing device 103, a user entity 110, and a network 120, though the computing environment 100 may include additional, alternative, or fewer components for providing functionality for the computing environment 100. The digital environment 101, the server 102, the user computing device 103, and any other component or computing device of the computing environment 100 may be communicatively coupled with one another, or with a subset of one another, via the network 120. Additionally or alternatively, the user entity 110 may communicate with the user computing device 103 via one or more input or output devices such as a microphone, a keyboard, a computer mouse, a touchscreen display, and the like.

The user entity 110 can use the user computing device 103 to access the network 120 to request resources, information, access, and the like from the server 102. For example, the user computing device 103 can receive natural language input, indications of selections, and the like from the user entity 110, and the user computing device 103 can convert the received input into a call, such as an API call or a REST call, that can be made via the network 120. In some examples, the network 120 can include any type of network that can support data communications using any of a variety of commercially available protocols. Examples of the network 120 can include TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. In some examples, the network 120 may be or include a local area network (LAN) such as one based on Ethernet, Token-Ring or the like. The network 120 also may be or include a wide-area network, such as the Internet, or may include financial networks or banking networks, telecommunication networks such as a public switched telephone networks (PSTNs), cellular or other wireless networks, satellite networks, television/cable networks, or virtual networks such as an intranet or an extranet, etc. Infrared and wireless networks, such as those using the Institute of Electrical and Electronics (IEEE) 802.11 protocol suite or other wireless protocols, may also be included in the communication networks.

The server 102 can receive the call from the user computing device 103 and can provide a user interface 104, and any user interface pages or sub-pages included therein, to the user computing device 103. The user interface 104 can include graphical objects, which may be selected or may be static, and can include other suitable features for a user interface. The graphical objects may be or include features that can be displayed on the user interface 104 and that may or may not be interactive, that may or may not be dynamic, such as changing after a predetermined amount of elapsed time, etc. For example, the graphical objects may include design features of the user interface 104, may include logos, emblems, trademarks, etc., and the like. The user interface 104 may additionally or alternatively include interactive elements that may be or include features that can be displayed on the user interface 104 and with which can be interacted. For example, the user entity 110 may use the user computing device 103 to interact, for example by clicking or otherwise suitably indicating selection, with one or more of the interactive elements. In some examples, the interactive elements may include one or more subsets of possible interactive elements that can be provided via the user interface 104. The one or more subsets of possible interactive elements can include a set of first interactive elements and a set of second interactive elements. The set of first interactive elements can be or include interactive elements that correspond to or otherwise represent a particular potential interaction or service of a set of services. Additionally or alternatively, the set of second interactive elements can be or include interactive elements that correspond to or otherwise represent particular data or types of data associated with a selected potential interaction or service of the set of services.

In response to receiving a request from the user computing device 103 to access a user account associated with the user entity 110, the server 102 can verify an authenticity of the request. For example, the request may be or include an authentication request with authentication data, and the server 102 can request an authentication, such as an enhanced or more scrutinized authentication, from the user entity 110, for example to verify an identity of the user entity 110 or a validity of the received request. For example, the server 102 may request that the user entity 110 provide multifactor authentication (MFA) as the authentication to verify the identity of the user entity 110. Providing the MFA can involve inputting one or more additional or alternative authentication factors than those included in the received request. Examples of the authentication factors can include a username, password, biometric marker, personal identification number (PIN), authentication code, one-time password authentication, or any combination thereof. In some examples, the user computing device 103 may include an authenticator application installed on the user computing device 103 to provide the MFA as the authentication to the server 102.

In response to authenticating the request or otherwise determining that the request is legitimate, the server 102 can provide the user interface 104 to the user computing device 103. In some examples, the server 102 can access information relating to the user account of the user entity 110 to populate a first user interface page of the user interface 104. The accessed information may be or include digital interactions that the user entity 110 has previously, or is presently, requesting to initiate, may be or include account information associated with the user entity 110 or the user account thereof, etc. In some examples, the digital interactions may be or include disputed previously executed interactions. The server 102 can generate a list of interactive elements to be provided to the user entity 110 via the user interface 104 based at least in part on the digital environment 101. The server 102 can transmit the user interface 104 to the user computing device 103.

In some examples, the user interface 104 can be used to access the digital environment 101 and any sub-pages or functions thereof. The user entity 110 can log into the user account and, upon being authenticated, can be provided access to the digital environment 101 via the user interface 104. That is, elements of the digital environment 101 can be provided to the user entity 110 via the user interface 104 displayed on the user computing device 103. The user entity 110 may be able to interact with at least a subset of the elements of the digital environment 101 through interactions with the user interface 104.

The server 102 may be communicatively coupled with the digital environment 101 such as via the network 120. In some examples, the digital environment 101 may be integrated with or otherwise hosted on the server 102 such as included in software or hardware of the server 102, or vice versa. The server 102 can generate a call, such as an API call, a query, a REST call, or the like, and can transmit the call to the digital environment 101 to interact with the digital environment 101. The call may include the data or information required to access data from the digital environment 101, to analyze, such as via an artificial intelligence model 125, data from the digital environment 101, to update the digital environment 101, or to perform other suitable operation. Additionally or alternatively, the call may include an indication of a particular backend processing service to use for interacting with, or analyzing, data associated with the digital environment 101. The server 102 may determine which backend processing service to use based on the requested operation, the associated user account, or the like.

The digital environment 101 may include various communication channels with which the user entity 110 may interact or through which the user entity 110 may be interacted by a provider entity that provides the digital environment 101. As illustrated in FIG. 1, the digital environment 101 can include a first communication channel 150*a* and a second communication channel 150*b*, though other suitable numbers, such as one or more than two, of communication channels are possible for the digital environment 101. The first communication channel 150*a* may be configured to facilitate a first type of communication associated with the user account, and the second communication channel 150*b* may be configured to facilitate a first type of communication associated with the user account. For example, the first communication channel 150*a* may include or facilitate public communications 152*a*, and the second communication channel 150*b* may include or facilitate private communications 152*b*. The public communications 152*a* may include communications that are not restricted, or have fewer restrictions than private communications 152*b*, with respect to who, among entities able to access the digital environment 101, can access or interact with the communications. The private communications 152*b* may be selectively restricted. That is, only a certain user entity or set of user entities may access or interact with the private communications 152*b*. An example of the public communications 152*a* may be or include a message board, which can host questions, comments, or the like, provided by the digital environment 101, and an example of the private communications 152*b* may be or include a private messaging feature provided by the digital environment 101.

The digital environment 101 may receive the call from the server 102 and may divert the data included in the call to the first communication channel 150*a* or to the second communication channel 150*b*. For example, the call may indicate a particular sub-page of the digital environment 101 accessed by the user entity 110 for generating the call, and the particular sub-page may indicate a particular communication channel to which to divert the data. Additionally or alternatively, the call may include a request for accessing data included in the first communication channel 150*a* or the second communication channel 150*b*. For example, the server 102 may request access to particular data associated with the user account previously communicated via the first communication channel 150*a* or the second communication channel 150*b*. In a particular example, the server 102 may request data relating to a question communicated by the user entity 110 via the first communication channel 150*a* of the digital environment 101, and the server 102 may receive the data and apply the artificial intelligence model 125 to the data to facilitate service, to customize the digital environment 101 for the user entity 110, to perform other suitable operations, or any combination thereof.

In some examples, the artificial intelligence model 125 may be or include a large language model or other suitable artificial intelligence model that can receive natural language input and generate natural language output. The artificial intelligence model 125 may be resident on memory or other computing hardware associated with the server 102 or in other locations that are accessible by the server 102. The artificial intelligence model 125 may be trained using one or more training datasets that include labeled or unlabeled natural language data points. In some examples, the training datasets may include previously transmitted communications associated with the user entity 110. The trained artificial intelligence model may be configured to receive input data, such as one or more communications transmitted via the digital environment 101 by the user entity 110, and to generate one or more outputs that can include recommendations for service to offer or initiate on behalf of the user entity 110. In some examples, based on the output from the artificial intelligence model 125, the server 102 may automatically determine a service to initiate or execute for the user entity 110.

The server 102 can determine a particular process for initiating the service, for completing the service, and the like. Additionally or alternatively, the server 102 can determine a set of data, documents, information, and the like that can be used to initiate or complete the service. In some examples, to determine the process or the set of data, etc., the server 102 can analyze the service to identify a type of account associated with the service, to identify a progress of the service, to identify a type or other classification associated with a previously executed interaction of the service, and the like. The server 102 can use a result of the analysis to determine the process, to determine the set of data, etc., and the like. Additionally or alternatively, the server 102 can use the result of the analysis to control communication between the server 102 and the digital environment 101, for example to initiate or facilitate the service.

Although FIG. 1 illustrates a particular number and arrangement of components, FIG. 1 is intended to be illustrative and non-limiting. Other examples may include more components, fewer components, different components, or a different arrangement of the components shown in FIG. 1. Any suitable arrangement of the depicted components is contemplated herein.

Figure 2:
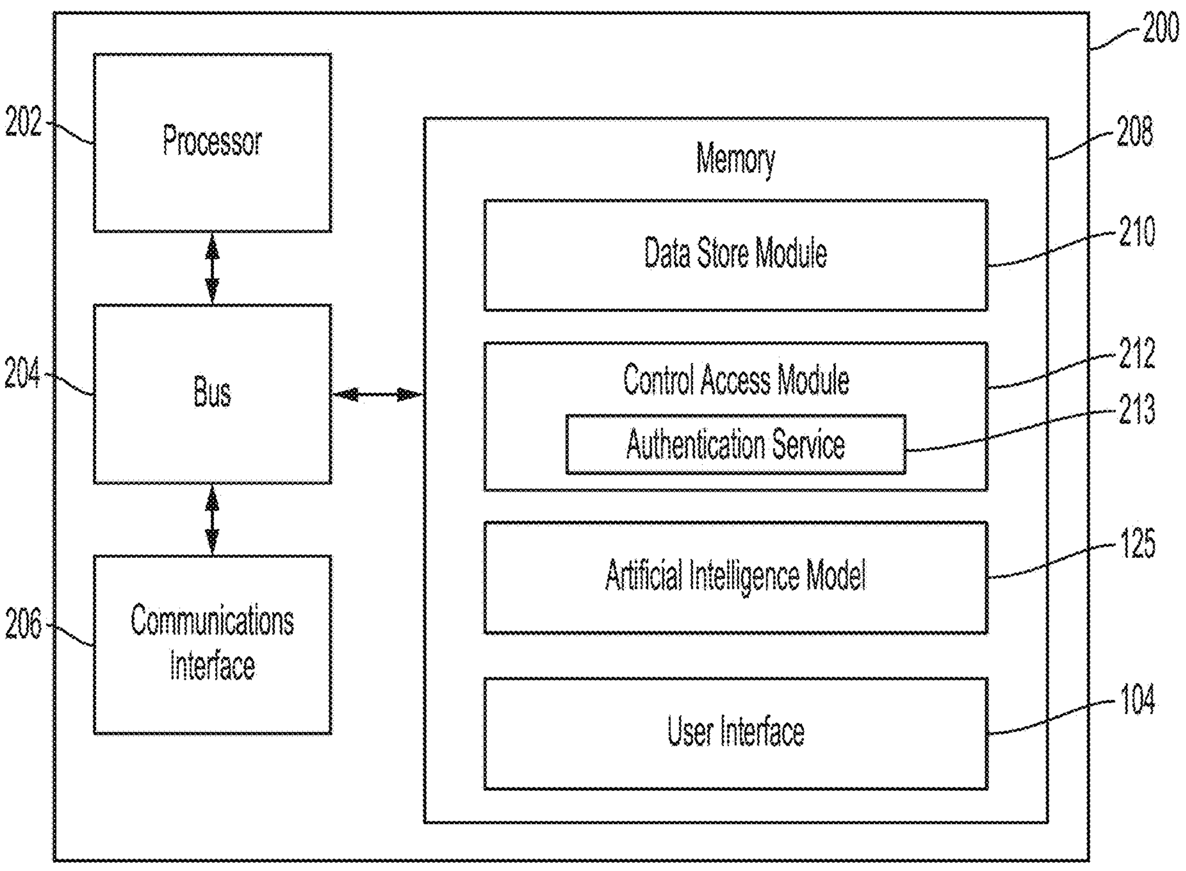
FIG. 2 is a block diagram of an example of a computing system that can be used to facilitate service from a digital environment using artificial intelligence according to some implementations of the present disclosure.

FIG. 2 is a block diagram of an example of a computing system 200, such as the server 102, that can be used to facilitate service from a digital environment 101 using artificial intelligence according to some implementations of the present disclosure. The computing system 200 may be a network device and may include a processor 202, a bus 204, a communications interface 206, and a memory 208. In some examples, the components illustrated in FIG. 2 may be integrated into a single structure. For example, the components can be within a single housing. In other examples, the components illustrated in FIG. 2 can be distributed, such as in separate housings, and in electrical communication with each other.

The processor 202 may execute one or more operations for implementing various examples and embodiments described herein. The processor 202 can execute instructions stored in the memory 208 to perform the operations. The processor 202 can include one processing device or multiple processing devices. Non-limiting examples of the processor 202 include a Field-Programmable Gate Array ("FPGA"), an application-specific integrated circuit ("ASIC"), a microprocessor, etc.

The processor 202 may be communicatively coupled to the memory 208 via the bus 204. The memory 208, such as non-volatile memory, may include any type of memory device that retains stored information when powered off. Examples of the memory 208 can include electrically erasable and programmable read-only memory ("EEPROM"), flash memory, or any other type of non-volatile memory. In some examples, at least some of the memory 208 may include a medium from which the processor 202 can read instructions. A computer-readable medium may include electronic, optical, magnetic, or other storage devices capable of providing the processor 202 with computer-readable instructions or other program code. Examples of a computer-readable medium can include magnetic disk(s), memory chip(s), ROM, random-access memory ("RAM"), an ASIC, a configured processor, optical storage, or any other medium from which a computer processor may read instructions. The instructions may include processor-specific instructions generated by a compiler or an interpreter from code written in any suitable computer-programming language, including, for example, C, C++, C #, Java, Python, Perl, R, etc.

The communications interface 206 may interface other network devices or network-capable devices to analyze and receive information related to accessing functions of an application. Information received from the communications interface 206 may be sent to the memory 208 via the bus 204. The memory 208 can store any information received from the communications interface 206.

The memory 208 may include program code for determining user interface pages, and data to embed therein, to provide for the user interface 104. The program code may cause the computing system 200, or any component within the computing system 200, to make calls, such as API calls, to separate computing devices or digital environments to provide the user interface 104, to facilitate or control service provided to a user entity 110, etc. The memory 208 may additionally include program code for a data store module 210, a control access module 212, an artificial intelligence model 125, and the user interface 104. In some examples, the artificial intelligence model 125 may be a trained large language model or other suitable trained artificial intelligence model configured to receive natural language input and generate natural language output. The user interface 104 may allow the computing system 200 to receive user input that can be used to perform functions. Examples of functions can include determining the communication channel to transmit data on behalf of the user entity 110, determining one or more recommendations of service to offer or initiate for the user entity 110, adjusting the digital environment 101 to customize a user experience for the user entity 110, etc.

The data store module 210 may store information, such as username and password, security information, interaction data, etc., relating to a user account for a number of users and client devices, such as the user computing device 103, including originating IP addresses of login attempts, browser settings of login attempts, etc. The control access module 212 may include or be communicatively coupled to an authentication service 213 and may validate whether a user access attempt, such as by the user entity 110, has been successfully authenticated after a user has entered correct account login information. In some cases, the control access module 212 may additionally or alternatively determine that access to the digital environment 101 is requested. The results from the control access module 212 may be used by an API associated with the computing system 200 to request access to the user account, to determine an authentication process to perform with respect to the requested function, to authenticate the requested function (e.g., via the determined authentication process), and to cause the requested function to be executed. Additionally or alternatively, the results from the control access module 212 may be used by the user interface 104 or the computing system 200 to send a request for data or to send a request to execute a function to an API, for example for accessing or interacting with at least a portion of the digital environment 101.

Figure 3:
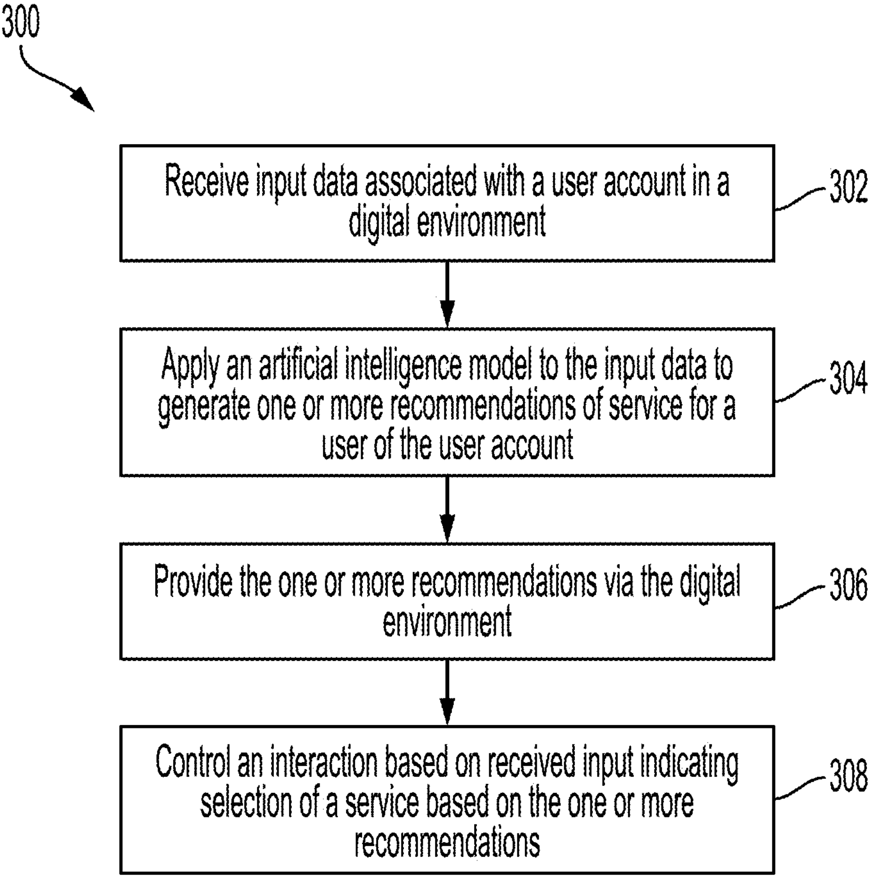
FIG. 3 is a flowchart of a process for facilitating service from a digital environment using artificial intelligence according to some implementations of the present disclosure.

FIG. 3 is a flowchart of a process 30 for facilitating service from a digital environment 101 using artificial intelligence according to some implementations of the present disclosure. In some examples, the server 102, or components such as the processor 202, or other components of the computing system 200, can perform one or more of the steps illustrated in FIG. 3. In other examples, the processor 202 can implement more steps, fewer steps, different steps, or a different order of the steps illustrated in FIG. 3. The steps of FIG. 3 are described below with reference to components discussed above in FIGS. 1-2.

At block 302, input data is received. The input data may be associated with a user account provided by a provider entity that generates, customizes, or provides a digital environment 101. The input data may originate from a user device such as the user computing device 103. For example, the user entity 110 may interact with the user interface 104 via the user computing device 103 to generate and transmit data to or via the digital environment 101. The user account may allow access, such as in response to an authentication process, to the digital environment 101 to allow the user entity 110 to selectively view or interact with features of the digital environment 101. In some examples, the user account may have a particular type or class. The type or class of the user account may be determined by the provider entity. For example, the provider entity may issue user accounts having different classes or types for different purposes or functions.

In some examples, the digital environment 101 may selectively allow access based on the type or class of the user account. That is, only certain types of user accounts may be issued for accessing, or may be allowed to access, the digital environment 101. In an example, the digital environment 101 may be, may include, or may be associated with a social networking application that is designed for a specific subset of a population. The social networking application may be generated and provided by the provider entity for user entities associated with a set of interaction types provided by the provider entity. In a particular example, the social networking application may be designed for use by small business owners or other entities associated with small businesses. User accounts not associated with a small business may not be issued for accessing the digital environment 101 or may otherwise not be allowed to access the digital environment 101.

User accounts that are issued for accessing the digital environment 101 or that can otherwise be used to access the digital environment 101 may interact with one another. For example, the digital environment 101 may maintain one or more public communication channels, such as the first communication channel 150*a*, to allow user accounts to generate and transmit communications, such as questions, comments, votes, and the like, for other user accounts to access or interact. The input data may be, may include, or may be gleaned from the transmitted communications within the digital environment 101. For example, a first communication transmitted via the first communication channel 150*a* of the digital environment 101 may be accessed and retrieved by the server 102 as the input data. Second communications transmitted via the second communication channel 150*b* may additionally or alternatively be accessed and retrieved by the server 102 as the input data.

At block 304, an artificial intelligence model, such as the artificial intelligence model 125, is applied to the input data to generate one or more recommendations. The artificial intelligence model may be or include a trained machine-learning model, a trained generative artificial intelligence model, such as a large language model, or other suitable trained artificial intelligence model. The trained artificial intelligence model may be trained on training data that includes historical communications that may be labeled to improve an accuracy of outputs of the trained artificial intelligence model compared to other outputs from untrained models. The one or more recommendations may include one or more recommendations for service to provide or facilitate on behalf of a user entity associated with the user account from which at least a portion of the input data originated. The one or more recommendations of service may include one or more services in which each service of the one or more services has a likelihood predicted by the trained artificial intelligence model that is higher than a threshold likelihood. The likelihood may be or include a probability that the user entity will accept or request the corresponding service. The trained artificial intelligence model may be configured to generate the likelihood for each service based at least in part on the input data, which can include questions posed by the user entity, interests indicated by the user entity, or other interactions with the digital environment 101 by the user entity.

At block 306, the one or more recommendations are provided via the digital environment 101. In some examples, the one or more recommendations may be provided to the user entity 110 via the first communication channel 150*a*, via the second communication channel 150*b*, or via other suitable communication channels. The server 102 may receive input data from a question posed by the user entity 110 in the first communication channel 150*a*, which may include public communications 152*a*, and the server 102 may cause the trained artificial intelligence model to generate the one or more recommendations based on the input data. The server 102 may transmit the one or more recommendations to the user entity 110 via the second communication channel 150*b*, which may include private communications 152*b*.

In some examples, the one or more recommendations can be provided via a separate application or via a separate environment from the digital environment 101. The digital environment 101 may be or include a social networking application provided by the provider entity, and the provider entity may provide a separate banking application. The one or more recommendations may be generated for a user entity based on input from data transmitted via the digital environment 101, and the server 102 may provide the one or more recommendations to a second user account issued for the separate banking application for the user entity. In a particular example, the provider entity may provide an online account security application and may provide the digital environment 101. The provider entity may issue a first user account for a user entity to access the digital environment 101, and the provider entity may issue a second user account for allowing the user entity to receive service from the online account security application. The user entity may use the first user account to transmit data, such as a question, via the digital environment 101. The provider entity, such as via the server 102, may cause the question to be used as input to the trained artificial intelligence model to generate one or more recommendations for service, such as online account security service, to provide or offer to the user entity. The provider entity, such as via the server 102, may transmit the one or more recommendations to the user entity via the second user account.

At block 308, an interaction is controlled based on received input indicating selection of a service based on the one or more recommendations. Controlling the interaction may include automatically initiating the interaction, generating and transmitting instructions to a separate computing device for initiating the interaction, or otherwise facilitating initiation of the interaction. The interaction may take place between at least the user entity and the provider entity. For example, the selected service may be or include a service provided by the provider entity, and the user entity may select the service to be provided by the provider entity on behalf of, or otherwise for, the user entity.

In some examples, the trained artificial intelligence model may, for example without additional input from the user entity, automatically initiate a particular service having a likelihood exceeding a threshold likelihood. The threshold likelihood may be a probability generated by the trained artificial intelligence model that indicates that the user entity is nearly certain to request or select the corresponding service. The trained artificial intelligence model may initiate the service and may request confirmation from the user entity upon initiation to continue the service.

Figure 4:
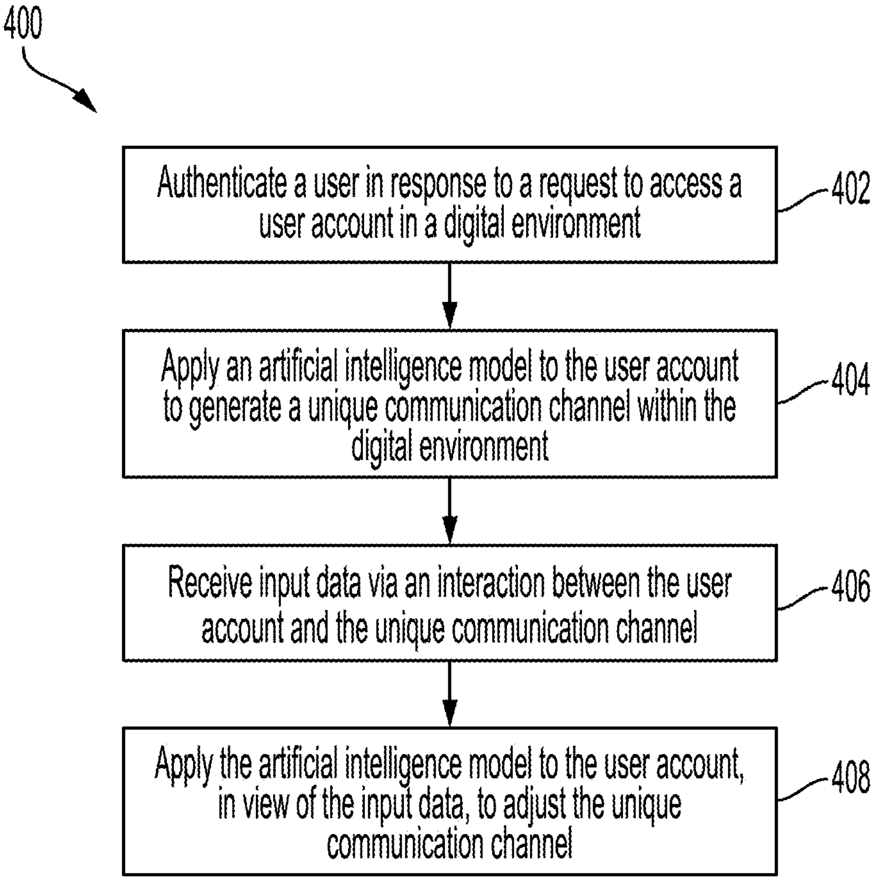
FIG. 4 is a flowchart of a process for generating and adjusting a unique communication channel within a digital environment using artificial intelligence according to some implementations of the present disclosure.

FIG. 4 is a flowchart of a process 400 for generating and adjusting a unique communication channel within a digital environment 101 using artificial intelligence according to some implementations of the present disclosure. In some examples, the server 102, or components such as the processor 202, or other components of the computing system 200, can perform one or more of the steps illustrated in FIG. 4. In other examples, the processor 202 can implement more steps, fewer steps, different steps, or a different order of the steps illustrated in FIG. 4. The steps of FIG. 4 are described below with reference to components discussed above in FIGS. 1-2.

At block 402, a user entity is authenticated in response to a request to access a user account in a digital environment such as the digital environment 101. The server 102 may authenticate the user entity in response to receiving authentication data, or favorable results from an authentication process, and the server 102 may provide to the user entity, such as via the user computing device 103, access to the user account. The user account may be issued for accessing or interacting with the digital environment 101. For example, the user entity may transmit data or otherwise suitably interact with the digital environment 101 via the user account. In some examples, the user account may be used to transmit a communication, such as a question, a comment, a vote, or other suitable communication, via at least one communication channel of the digital environment 101.

At block 404, an artificial intelligence model is applied to the user account. In some examples, the artificial intelligence model may be or include a trained artificial intelligence model such as a trained large language model. The trained artificial intelligence model may be configured to receive data about the user account and to generate a unique communication channel for transmitting data to the user account. For example, upon successfully authenticating the user account, the server 102 may apply the trained artificial intelligence model to the user account, such as interaction history of the user account, demographic data associated with the user account, or other suitable data or metadata about the user account, to generate the unique communication channel. The unique communication channel may be generated prior to providing access to the digital environment 101 to the user account, and, once generated, the unique communication channel may be transmitted to, or otherwise made available, to the user account.

In some examples, the unique communication channel may be customized for the user entity. That is, the unique communication channel may include communications or other content that the user entity may be likely to enjoy, with which to interact, or may otherwise request. In a particular example, if the user account indicates that the user entity is interested in small business topics, the trained artificial intelligence model may be configured to generate a unique communication channel that includes more communications or content relating to small business topics than other unique communication channels for other user entities. In a particular example, the unique communication channel may include a scrollable content feed that may be or include public communications **152*a***, and the unique communication channel may be configured to present individual communications from other user entities that can be interacted with via the user account.

At block 406, input is received from an interaction involving the user account. The input may indicate or represent a communication transmitted in the unique communication channel via the user account. For example, the user entity may use the user account to post a question to the digital environment 101 via the unique communication channel, though other suitable communications other than questions are possible. The server 102 may monitor, such as continuously or periodically, interactions in the unique communication channel by the user account and may continuously or periodically access or retrieve data to enhance an experience of the user entity in the digital environment 101. For example, the server 102 may continuously or periodically monitor the unique communication channel to gather data to provide to the trained artificial intelligence model to facilitate service for the user entity, to facilitate an enhanced unique communication channel for the user entity, and the like.

At block 408, the trained artificial intelligence model is applied to the input received at the block 406 to adjust the unique communication channel. In some examples, the communications transmitted via the unique communication channel of the digital environment 101 may indicate a change in interests of the user entity, a change in strategy for the user entity using the unique communication channel, or the like. The communications may be captured, such as via the user account, and the trained artificial intelligence model may be applied to the user account to capture any changes indicated by communications transmitted by the user account. For example, the trained artificial intelligence model may be periodically or continuously applied to the user account to determine likelihoods corresponding to whether the user entity may be interested in, or whether the user entity is likely to interact with, certain types or classes of communications or content via the unique communication channel. The trained artificial intelligence model may receive the updated user account, or the communications transmitted therefrom, and the trained artificial intelligence model may output one or more adjustments to the unique communication channel. For example, the one or more adjustments may include an update to a visual tone of the unique communication channel, an update to communications or content provided via the unique communication channel, or other suitable adjustments. The one or more adjustments may cause the unique communication channel to align better with interests, whether explicitly stated or inferred by the trained artificial intelligence model, indicated by the user account or communications associated therewith.

Figure 5:
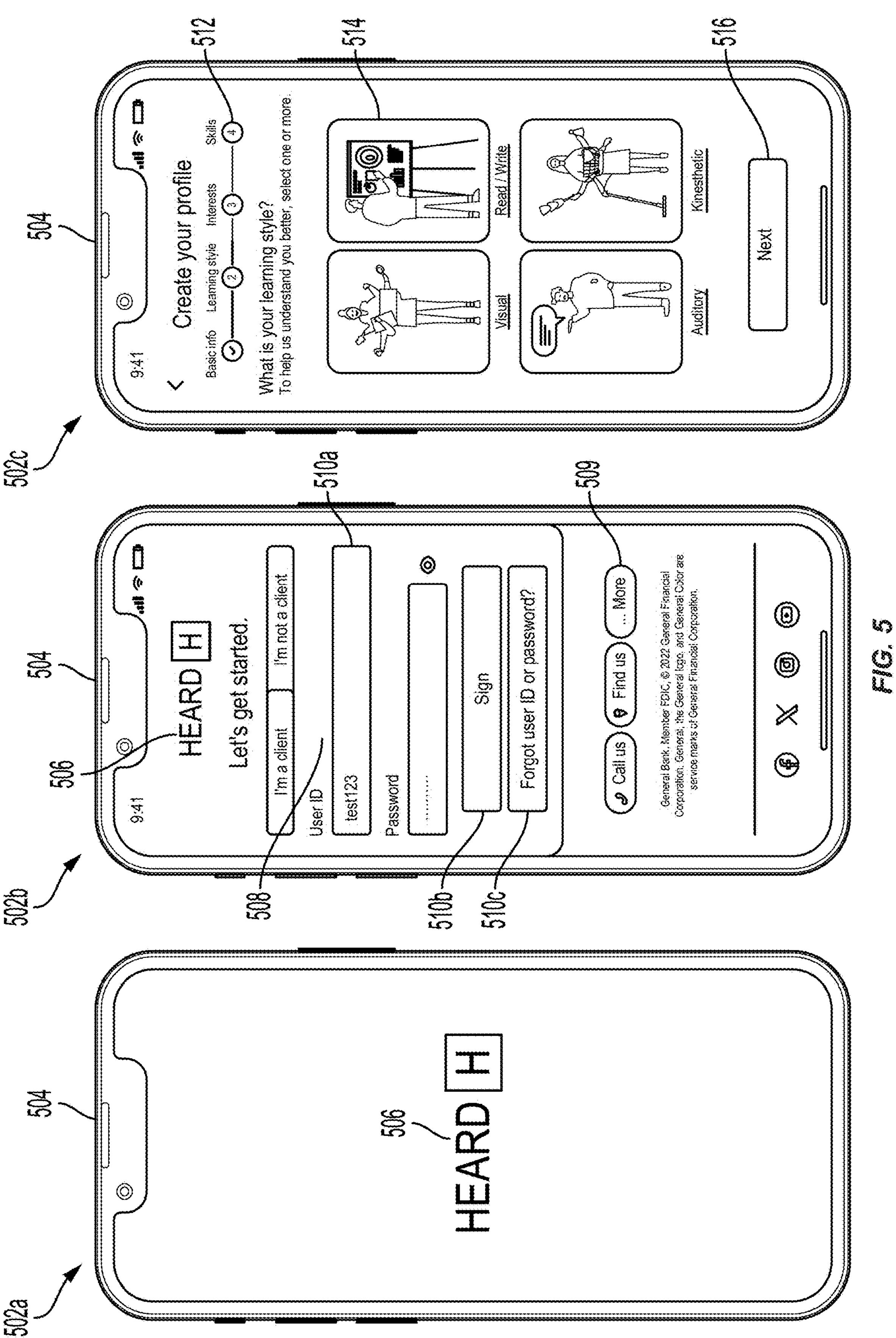
FIG. 5 is an example of three display screens associated with accessing a digital environment according to some implementations of the present disclosure.

FIG. 5 is an example of three display screens associated with accessing a digital environment according to some implementations of the present disclosure. As illustrated in FIG. 5, the three display screens include an initial screen 502*a*, a login screen 502*b*, and a profile creation screen 502*c*. Each screen of the three display screens may be configured to be provided via a mobile computing device 504, though other suitable devices, such as a personal computing system, a laptop, a tablet computer, etc., are possible for displaying the three display screens. The three display screens may be illustrated as displaying a portion of an application for allowing access to the digital environment 101. For example, the application may be or include H.E.A.R.D., or helping entrepreneurs achieve results and development, which can be or include a social networking application designed to assist particular entities with communications, development, and the like. Other suitable applications may be possible for the three display screens.

The initial screen 502*a* may be or include an initial screen that a user entity may be presented after selecting the application. For example, the mobile computing device 504 may receive input indicating selection of the application, and a processor of the mobile computing device 504 may execute the application. While the processor is executing the application to provide access via the mobile computing device 504, the initial screen 502*a* may be presented as a waiting screen or a screen that identifies the application that was selected. In some examples, the initial screen 502*a* may include a logo 506 that can be specific to the application and that may identify the application to a viewer of the initial screen 502*a*.

The login screen 502*b* may be presented via the mobile computing device 504 after the processor successfully executes the application or an initiation sequence of the application. The login screen 502*b* may be presented to a user of the mobile computing device 504 to provide input data for an authentication process or to request a user account be issued for access to the digital environment 101. As illustrated in FIG. 5, the login screen 502*b* can include the logo 506, a set of interactive fields 508, and contact information 509, which may provide user support information to a viewer of the login screen 502*b*. The logo 506 may match the logo 506 presented on the initial screen 502*a*. The set of interactive fields 508 may include one or more fields that can receive input. For example, the set of interactive fields 508 may include a first field 510*a* for inputting a user name or password in natural language or otherwise using a keyboard or other suitable input device. Additionally or alternatively, the set of interactive fields 508 may include a second field 510*b* and a third field 510*c* that may receive mouse clicks or other suitable selections for executing a particular process. As illustrated in FIG. 5, the second field 510*b* may include a button for attempting to login with input data in other fields of the set of interactive fields 508. Additionally or alternatively, the third field 510*c* may include a button for requesting a user account be issued or created for accessing the digital environment 101. In some examples, selecting the third field 510*c* may cause the profile creation screen 502*c* to be displayed.

The profile creation screen 502*c* may be presented via the mobile computing device 504 in response to receiving a request, such as via a selection of the third field 510*c*, to issue or create a user account for accessing the digital environment 101. The server 102, or other suitable backend computing device communicatively coupled with the mobile computing device 504, can determine whether the user of the mobile computing device 504 qualifies for a user account for accessing the digital environment 101. For example, the server 102 may cause an intermediate screen to be displayed to gather additional information about the user entity. The additional information may include separate account or authentication data relating a different type of account that is provided by a common provider entity that also provides the digital environment 101 or application. That is, the server 102 may determine that the user entity qualifies for the issued user account by making sure that the user entity also has a separate qualifying account with the provider entity. In a particular example, the user entity may have a qualifying small business account with the provider entity, and the server 102 may verify that the user entity has the small business account prior to issuing the user account to access the digital environment 101.

As illustrated in FIG. 5, the profile creation screen 502*c* can include a progress bar 512, a set of interactive fields 514, and a progression button 516, which can control, via receiving input such as a selection of the progression button 516, navigation from page-to-page of the profile creation process. The progress bar 512 can indicate a position along the profile creation process or otherwise indicate a progress of how much of the profile creation process has been complete or how much more of the profile creation process is left to go. For example, and as illustrated in FIG. 5, the progress bar 512 can indicate that the user entity is in the step of learning style selection of the profile creation process. The learning style selection can allow the user entity to select learning styles that the user entity prefers to use for learning new topics. The selected learning style or styles may be stored at the user account and may be subsequently used for facilitating service using artificial intelligence, for adjusting or customizing a unique communication channel of the digital environment 101, etc. The set of interactive fields 514 may allow the user entity to select the particular learning style during the learning style selection step. For example, the set of interactive fields 514 may include one or more buttons corresponding to different learning styles. In other steps of the profile creation process, the set of interactive fields 514 may include different buttons, fillable fields, or other suitable interactive fields to facilitate input from the user entity for creating the profile for the user account.

Figure 6:
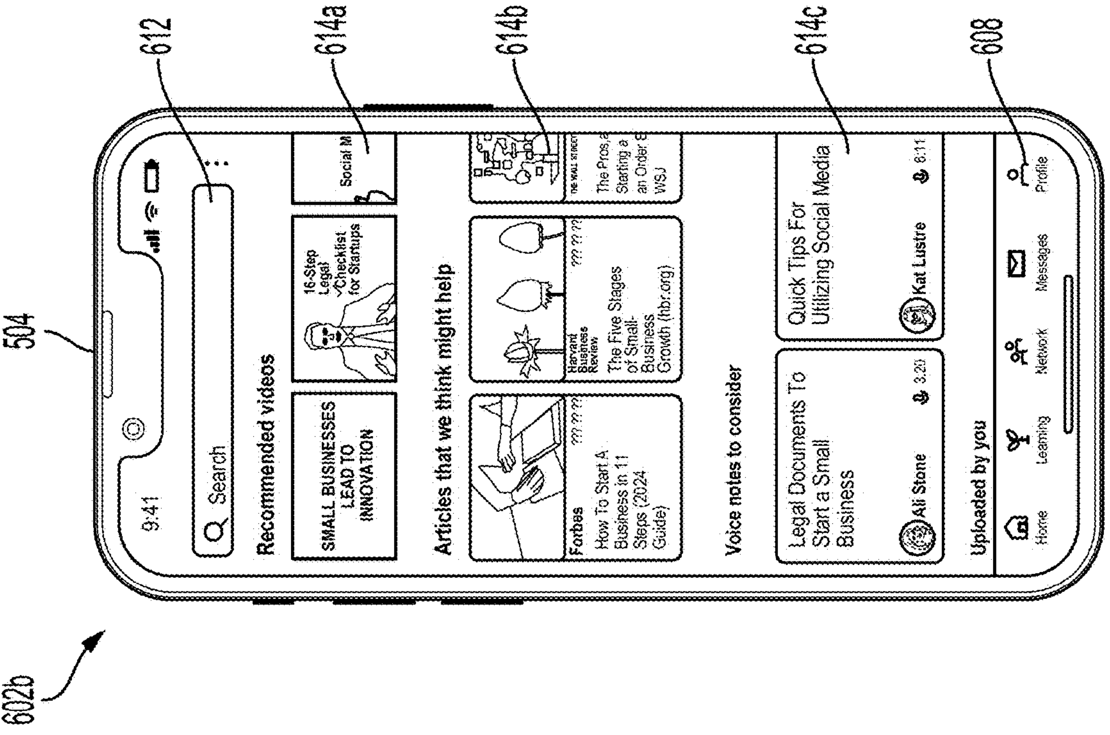
FIG. 6 is an example of two display screens associated with a digital environment according to some implementations of the present disclosure.
Figure 6:
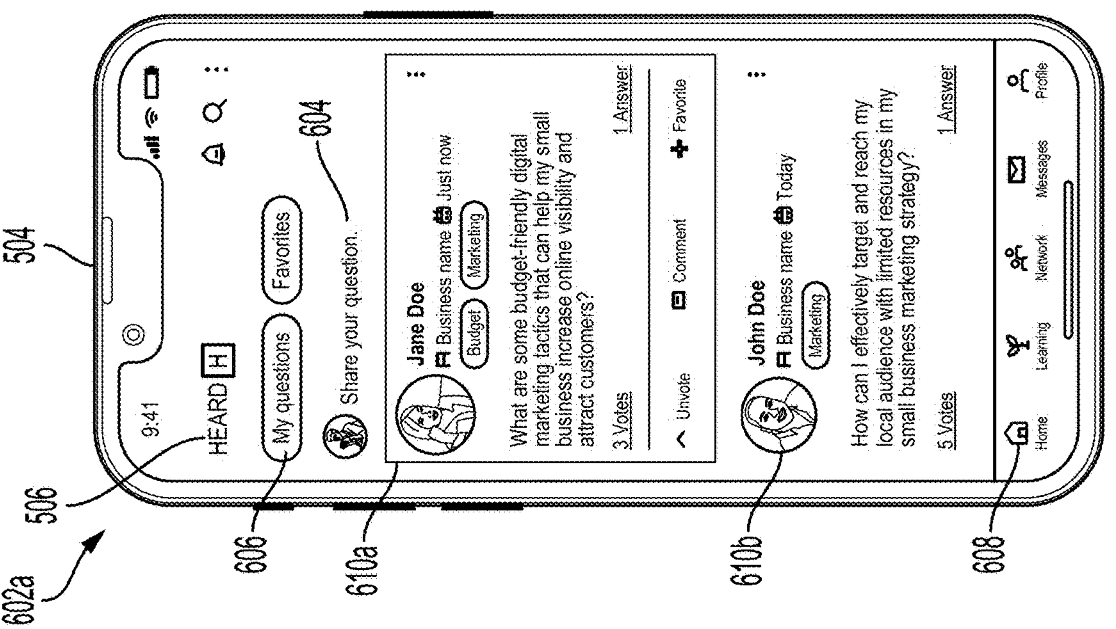

FIG. 6 is an example of two display screens associated with the digital environment 101 according to some implementations of the present disclosure. As illustrated in FIG. 6, the two display screens can include a home page 602*a* and a learning page 602*b*. Once the user account is issued, authenticated, or a combination thereof for a user entity requesting access to the digital environment 101, the server 102 may cause the home page 602*a* to be displayed via the mobile computing device 504. In some examples, the home page 602*a* may be or include a sub-page of the digital environment 101 and may be or include a unique communication channel for the user entity associated with the authenticated user account. The server 102 may execute the trained artificial intelligence model to identify content, communications, or a combination thereof to populate on the home page 602*a* prior to providing the home page 602*a* via the mobile computing device 504. That is, the server 102 may apply the trained artificial intelligence model to the user account, or any data or interactions thereof, to generate a unique communication channel to present to the user entity via the home page 602*a* displayed on the mobile computing device 504.

As illustrated in FIG. 6, the home page 602*a* may include the logo 506, a communication field 604, quick links 606, and navigational buttons 608, though the home page 602*a* may include any additional, alternative, or fewer components than those illustrated in FIG. 6. The logo 506 may match the initial screen 502*a* and other instances of the logo throughout sub-pages of the application that provides access to the digital environment 101. The communication field 604 may be or include an interactive field that can accept input from the mobile computing device 504. For example, natural language may be input into the communication field 604, and, upon confirmation of the input, the server 102 may cause the natural language input to be converted to a communication that can be transmitted via, such as posted on, the digital environment 101. The communication may populate in the unique communication channel such as via communication 610*a* or communication 610*b*. Other communications, such as those from other user entities or other user accounts, can also be displayed via the home page 602*a* and unique communication channel. The communications can be interacted with, for example by other user accounts and by adding another communication, by voting on whether the communication is helpful or interesting, etc., and the interactions with the communications can be used as an input to the trained artificial intelligence model for facilitating service from the digital environment 101, for customizing the unique communication channel for the user account, etc.

The quick links 606 may be or include one or more links that, when selected, can cause a particular action to be taken in the digital environment 101 on behalf of the user account. For example, the quick links 606 can include a particular quick link to display only communications generated by the user account. Other examples are possible. The navigational buttons 608 can allow, such as based on selection of one or more of the navigational buttons 608, the user account to navigate within sub-pages of the application that provides the digital environment 101.

As illustrated in FIG. 6, the learning page 602*b* may include a search field 612, a set of content fields that include a first content field 614*a*, a second content field 614*b*, and a third content field 614*c*, and the navigational buttons 608, which can be the same or similar to the navigational buttons 608 on the home page 602*a*. In some examples, the learning page 602*b* may be customized by the server 102 to be relevant to the interests, whether expressed or implied, of the user entity associated with the user account. That is, the trained artificial intelligence model may be applied to the user account, or any data associated therewith, to select particular content to include on the learning page 602*b*, which may be customized based on the user account. The search field 612 may allow the user entity to input a search query, such as in natural language, to search for particular learning content. The set of content fields may include one or more fields corresponding with different types of content. For example, the first content field 614*a* may include video content recommended by the server 102 for the user entity, the second content field 614*b* may include text-based article content recommended by the server 102 for the user entity, and the third content field 614*c* may include voice-based content recommended by the server 102 for the user entity. The set of content fields may be customized by the server 102, for example via application of the trained artificial intelligence model, to present content to the user entity that the user entity is most likely to enjoy, to benefit from, or with which to interact. The trained artificial intelligence model may generate one or more probabilities for each content, and the probabilities can be used to determine which content to provide via the learning page 602*b* to the user entity.

Figure 7:
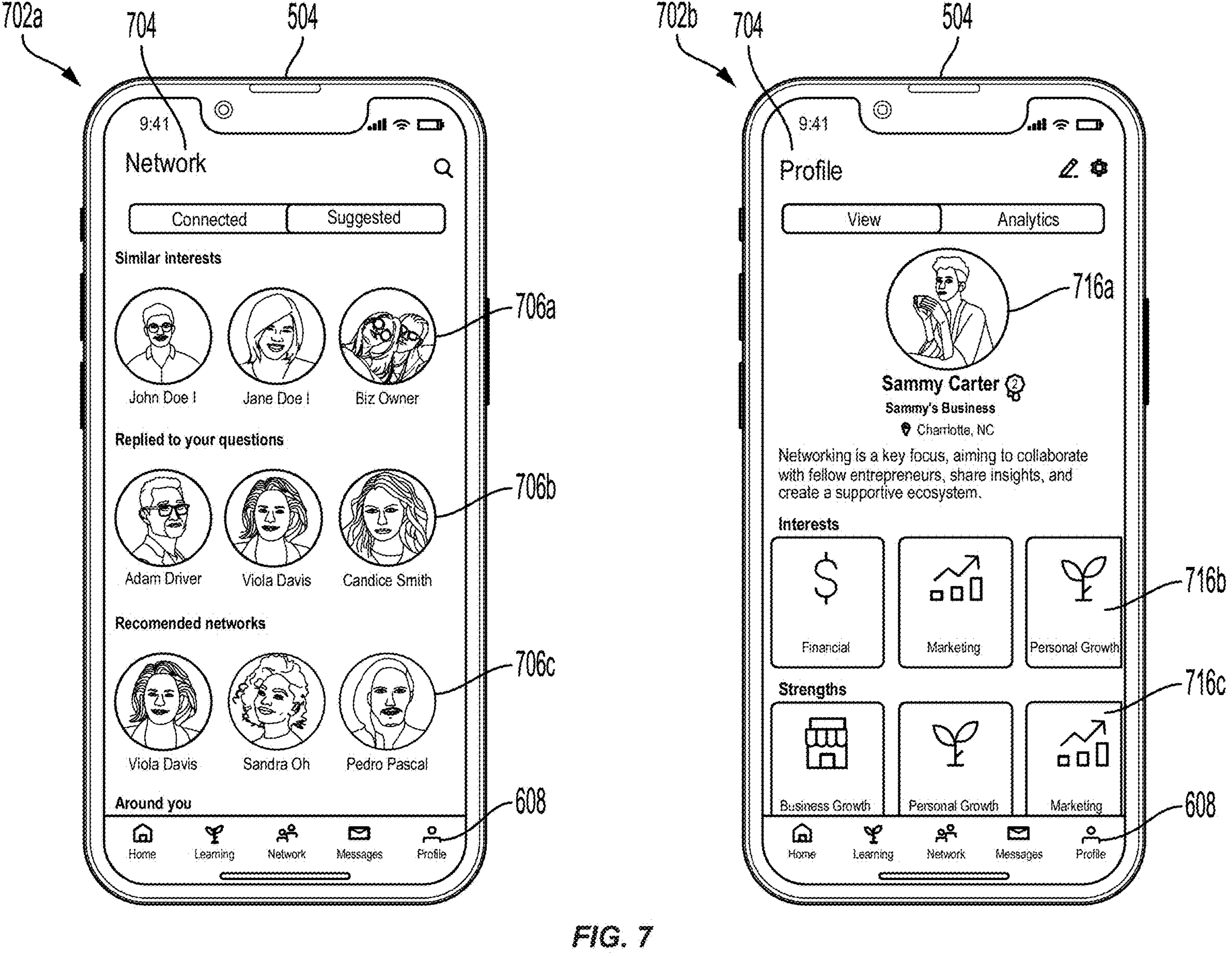
FIG. 7 is another example of two display screens associated with a digital environment according to some implementations of the present disclosure.

FIG. 7 is another example of two display screens associated with a digital environment according to some implementations of the present disclosure. As illustrated in FIG. 7, the two display screens can include a network page 702*a* and a profile page 702*b*, though other suitable pages are possible for the two display screens. The network page 702*a* and the profile page 702*b* may be sub-pages of an application that provides the digital environment 101 and may be associated with, or otherwise customized for, the user account.

As illustrated in FIG. 7, the network page 702*a* can include a title 704, which may indicate or represent the sub-page displayed on the mobile computing device 504, a set of networking features, such as a first networking feature 706*a*, a second networking feature 706*b*, and a third networking feature 706*c*, and the navigational buttons 608. The set of networking features may allow the user entity, such as via the user account, to communicate with other user entities via other user accounts. The other user accounts may be identified by the server 102 such as by applying the artificial intelligence model to the user account or communications or interactions associated therewith. In some examples, each networking feature of the set of networking features may highlight particular types of user accounts from which the user entity may benefit, or may otherwise want to, interacting. As illustrated in FIG. 7, the first networking feature 706*a* can include a scrolling, such as horizontally scrolling, list of other user accounts that have interests, expressed or implied, similar to those of the user account. Additionally or alternatively, the second networking feature 706*b* can include a scrolling, such as horizontally scrolling, list of other user accounts that have previously interacted with a communication transmitted via the user account. Additionally or alternatively, the third networking feature 706*c* can include a scrolling, such as horizontally scrolling, list of other user accounts that are recommended by the server 102. The other user accounts may be recommended by the trained artificial intelligence model based on a location associated with the other user accounts, based on interactions performed by the other user accounts, based on other data associated with the other user accounts, or the like. The scrolling lists may be otherwise suitably oriented, such as not horizontally, and some networking features may not have a scrolling feature.

As illustrated in FIG. 7, the profile page 702*b* can include a title 704, which may indicate or represent the sub-page displayed on the mobile computing device 504, a set of profile features, such as a first profile feature 716*a*, a second profile feature 716*b*, and a third profile feature 716*c*, and the navigational buttons 608. The set of profile features can allow the user entity to make updates to the user account, to view data or statistics about the user account, or to perform other suitable operations with respect to the user account. For example, the first profile feature 716*a* may illustrate a preview of the user account and may be or include an interactive button that can be selected to make changes, such as security changes, visual changes, etc., to the user account. Additionally or alternatively, the second profile feature 716*b* may include interests indicated, whether expressed or implied, by the user account. The user entity may select one or more interactive features of the second profile feature 716*b* to deselect a particular interest, add a particular interest, adjust an importance of a particular interest, etc. Additionally or alternatively, the third profile feature 716*c* may include or indicate strengths, weaknesses, or a combination thereof for the user entity associated with the user account. For example, the user entity may indicate weaknesses in professional skills that the user entity would like to develop, may indicate strengths in professional skills that the user entity can use to mentor others, etc.

Although the subject matter has been described in language specific to structural features or methodological acts, it is to be understood that the subject matter defined in the appended claims is not necessarily limited to the specific features or acts described above. Rather, the specific features and acts described above are disclosed only for the purpose of illustration and description and they are not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A system comprising:

a processor; and a memory including instructions that are executable by the processor for causing the processor to perform operations comprising:

receiving a request to generate a first user account on behalf of an entity in a digital environment provided by a provider entity, the request comprising data identifying the entity;

transmitting a query to a database associated with the provider entity to request historical data about the entity;

in response to receiving a response from the database based on the query that indicates that the entity does not have any accounts or interactions associated with the provider entity, denying the request;

in response to receiving a response from the database based on the query that indicates that the entity has a second user account with the provider entity, generating the first user account, wherein the first user account is a first type of account that is different from a second type of account, and wherein the second user account is the second type of user account;

receiving, from a user device, a request to access the first user account in a digital environment;

authenticating the request to access the first user account in the digital environment;

generating, in response to authenticating the request, a user interface that is transmitted to the user device to be displayed on the user device through the first user account;

receiving historical interaction data associated with the first user account and associated with the second user account;

generating, based on providing the historical interaction data to an artificial intelligence model, a first unique communication channel to provide via the first user account, wherein the first unique communication channel is a public communication channel that comprises a scrollable communication channel configured to display real-time communications from other user accounts of the digital environment, and wherein each account of the other user accounts is the same type of account as the first user account;

generating a plurality of second unique communication channels, wherein each second unique communication channel of the plurality of second unique communication channels is a private communication channel that facilitates encrypted communications between the first user account and a different user account not associated with the entity, and wherein each the second unique communication channel of the plurality of second unique communication channels is generated in response to the first user account confirming that a corresponding user account is approved to use the second unique communication channel;

adjusting the user interface to display the first unique communication channel and to provide access to the plurality of second unique communication channels;

continuously monitoring the first unique communication channel and the plurality of second unique communication channels to determine (i) when questions are posted by the first user account to the first unique communication channel and (ii) when a particular interest is expressed in one or more second unique communication channels of the plurality of second communication channels;

receiving, at the first unique communication channel and in at least one second unique communication channel of the plurality of second unique communication channels, and in response to the continuously monitoring, input data including a question posted by the first user account to the first unique communication channel using the user interface and a message relating to the question sent in the at least one second unique communication channel, wherein the question and the message indicate the particular interest; and automatically adjusting, by applying the artificial intelligence model to the first user account, the question, and the message to the artificial intelligence model, the first unique communication channel, wherein the adjusting comprising automatically rearranging the real-time communications presented on the first unique communication channel according to the particular interest.

2. The system of claim 1, wherein the operations further comprise applying the artificial intelligence model to the first user account to generate the first unique communication channel by:

using the artificial intelligence model to determine one or more interests of an entity associated with the user account; and generating the first unique communication channel by identifying a plurality of content associated with the one or more interests, wherein each content item of the plurality of content has a likelihood above a threshold of being associated with the one or more interests.

3. The system of claim 1, wherein the operation of receiving the input data comprises receiving an indication that an entity of the first user account interacted with a particular type of content, wherein the operation of applying the artificial intelligence model to the first user account and the input data to adjust the first unique communication channel comprises applying a second weight to content of the particular type of content, and wherein the second weight is higher than a first weight originally associated with the particular type of content.

4. The system of claim 1, wherein the operations further comprise applying the artificial intelligence model to the input data and the first user account to generate one or more recommendations for service to an entity associated with the first user account.

5. The system of claim 4, wherein the operation of applying the artificial intelligence model to the input data and the first user account to generate one or more recommendations for service to an entity associated with the first user account comprises applying the artificial intelligence model to the input data and the first user account to determine one or more services to be included in the one or more recommendations, wherein the one or more services have one or more likelihoods for being used by the entity, and wherein each likelihood of the one or more likelihoods exceeds a threshold likelihood.

6. The system of claim 1, wherein the artificial intelligence model comprises a generative artificial intelligence model or a large language model, and wherein the operation of applying the artificial intelligence model to the first user account and the input data to adjust the first unique communication channel comprises inputting the input data and other data about the first user account into the generative artificial intelligence model or the large language model to adjust the first unique communication channel.

7. The system of claim 1, wherein the operations further comprise:

generating a third unique communication channel that is different from the first unique communication channel and the plurality of second unique communication channels, wherein the third unique communication channel facilitates one-way communications only from the provider entity to only the entity, and wherein the third unique communication channel is generated based on the particular interest;

providing the third unique communication channel to the first user account through the user interface, wherein the third unique communication channel comprises a set of content items generated by the provider entity and transmitted to the first user account via the user interface, and wherein the set of content items is selected based on the particular interest;

receiving a second question via the first unique communication channel and a second message via a different second unique communication channel of the plurality of second unique communication channels;

adjusting the set of content items to an adjusted set of content items by removing a first content item and adding a second content item, wherein the first content item is not related to the second question or the second message, and wherein the second content item is based on the second question and the second message; and updating the third unique communication channel to provide the adjusted set of content items to the first user account via the user interface.

8. The system of claim 1, wherein the operations further comprise:

receiving subsequent input data that is only associated with the first user account from the digital environment, wherein the subsequent input data is exclusively received from a set of communications made by only the first user account in only the first unique communication channel subsequent to the question;

in response to receiving the subsequent input data, accessing the second user account to extract historical interaction data that includes only previously executed interactions involving the entity exclusive with the second user account;

applying the artificial intelligence model to generate a recommendation for service to the entity through only the second user account, wherein applying the artificial intelligence model consists of:

determining, using the artificial intelligence model and based on the subsequent input data, the first user account, the historical interaction data, and the second user account, a plurality of services to be included in the recommendation for service, wherein each service of the plurality of services is only available to be invoked by the second user account;

determining, using the artificial intelligence model, a plurality of likelihoods corresponding with the plurality of services, wherein each service of the plurality of services corresponds with a different likelihood included in the plurality of likelihoods, wherein each likelihood included in the plurality of likelihoods is a likelihood that the service will be invoked by the entity through the second user account, wherein a subset of likelihoods of the plurality of likelihoods includes only likelihoods that exceed a threshold likelihood that is not exceeded by other likelihoods of the plurality of likelihoods corresponding with other services of the plurality of services, and wherein the artificial intelligence model determines each likelihood based only on the set of communications and the previously executed interactions;

generating, using the artificial intelligence model and based on the plurality of likelihoods, the recommendation by populating the recommendation with the subset of likelihoods and performing a rank-order sort to list a first service of the plurality of services before and larger than a second service of the plurality of services, wherein the first service has a first likelihood of the subset of likelihoods that is larger than a second likelihood of the subset of likelihoods corresponding with the second service;

generating a third unique communication channel that is different from the first unique communication channel and the plurality of second unique communication channels, wherein the third unique communication channel facilitates one-way communications only from the provider entity to only the entity, wherein the third unique communication channel is generated to include only the recommendation, wherein the third unique communication channel is arranged to present only the first service at a top-most point in the third unique communication channel with remaining services presented exclusively in descending order of likelihood based on corresponding likelihoods of the subset of likelihoods;

providing the recommendation to the first user account only using the third unique communication channel and through the user interface;

receiving input from the first user account within the third unique communication channel indicating selection of the first service and express denial of the remaining services; and transmitting a command only to the second user account, wherein the command comprises instructions that are executable to automatically initiate the first service through the second user account.

9. A method comprising:

receiving a request to generate a first user account on behalf of an entity in a digital environment provided by a provider entity, the request comprising data identifying the entity;

transmitting a query to a database associated with the provider entity to request historical data about the entity;

in response to receiving a response from the database based on the query that indicates that the entity does not have any accounts or interactions associated with the provider entity, denying the request;

in response to receiving a response from the database based on the query that indicates that the entity has a second user account with the provider entity, generating the first user account, wherein the first user account is a first type of account that is different from a second type of account, and wherein the second user account is the second type of user account;

receiving, from a user device, a request to access the first user account in a digital environment;

authenticating the request to access the first user account in the digital environment;

generating, in response to authenticating the request, a user interface that is transmitted to the user device to be displayed on the user device through the first user account;

receiving historical interaction data associated with the first user account and associated with the second user account;

generating, based on providing the historical interaction data to an artificial intelligence model, a first unique communication channel to provide via the first user account, wherein the first unique communication channel is a public communication channel that comprises a scrollable communication channel configured to display real-time communications from other user accounts of the digital environment, and wherein each account of the other user accounts is the same type of account as the first user account;

generating a plurality of second unique communication channels, wherein each second unique communication channel of the plurality of second unique communication channels is a private communication channel that facilitates encrypted communications between the first user account and a different user account not associated with the entity, and wherein each the second unique communication channel of the plurality of second unique communication channels is generated in response to the first user account confirming that a corresponding user account is approved to use the second unique communication channel;

adjusting the user interface to display the first unique communication channel and to provide access to the plurality of second unique communication channels;

continuously monitoring the first unique communication channel and the plurality of second unique communication channels to determine (i) when questions are posted by the first user account to the first unique communication channel and (ii) when a particular interest is expressed in one or more second unique communication channels of the plurality of second communication channels;

receiving, at the first unique communication channel and in at least one second unique communication channel of the plurality of second unique communication channels, and in response to the continuously monitoring, input data including a question posted by the first user account to the first unique communication channel using the user interface and a message relating to the question sent in the at least one second unique communication channel, wherein the question and the message indicate the particular interest; and automatically adjusting, by applying the artificial intelligence model to the first user account, the question, and the message to the artificial intelligence model, the first unique communication channel, wherein the adjusting comprising automatically rearranging the real-time communications presented on the first unique communication channel according to the particular interest.

10. The method of claim 9, further comprising applying the artificial intelligence model to the first user account to generate the first unique communication channel by:

using the artificial intelligence model to determine one or more interests of an entity associated with the first user account; and generating the first unique communication channel by identifying a plurality of content associated with the one or more interests, wherein each content item of the plurality of content has a likelihood above a threshold of being associated with the one or more interests.

11. The method of claim 9, wherein receiving the input data comprises receiving an indication that an entity of the first user account interacted with a particular type of content, wherein applying the artificial intelligence model to the first user account and the input data to adjust the first unique communication channel comprises applying a second weight to content of the particular type of content, and wherein the second weight is higher than a first weight originally associated with the particular type of content.

12. The method of claim 9, further comprising applying the artificial intelligence model to the input data and the first user account to generate one or more recommendations for service to an entity associated with the first user account.

13. The method of claim 12, wherein applying the artificial intelligence model to the input data and the first user account to generate one or more recommendations for service to an entity associated with the first user account comprises applying the artificial intelligence model to the input data and the first user account to determine one or more services to be included in the one or more recommendations, wherein the one or more services have one or more likelihoods for being used by the entity, and wherein each likelihood of the one or more likelihoods exceeds a threshold likelihood.

14. The method of claim 9, wherein the artificial intelligence model comprises a generative artificial intelligence model or a large language model, and wherein applying the artificial intelligence model to the first user account and the input data to adjust the first unique communication channel comprises inputting the input data and other data about the first user account into the generative artificial intelligence model or the large language model to adjust the first unique communication channel.

15. A non-transitory computer-readable medium comprising program code executable by a processing device for causing the processing device to perform operations comprising:

receiving a request to generate a first user account on behalf of an entity in a digital environment provided by a provider entity, the request comprising data identifying the entity;

transmitting a query to a database associated with the provider entity to request historical data about the entity;

in response to receiving a response from the database based on the query that indicates that the entity does not have any accounts or interactions associated with the provider entity, denying the request;

in response to receiving a response from the database based on the query that indicates that the entity has a second user account with the provider entity, generating the first user account, wherein the first user account is a first type of account that is different from a second type of account, and wherein the second user account is the second type of user account;

receiving, from a user device, a request to access the first user account in a digital environment;

authenticating the request to access the first user account in the digital environment;

generating, in response to authenticating the request, a user interface that is transmitted to the user device to be displayed on the user device through the first user account;

receiving historical interaction data associated with the first user account and associated with the second user account;

generating, based on providing the historical interaction data to an artificial intelligence model, a first unique communication channel to provide via the first user account, wherein the first unique communication channel is a public communication channel that comprises a scrollable communication channel configured to display real-time communications from other user accounts of the digital environment, and wherein each account of the other user accounts is the same type of account as the first user account;

generating a plurality of second unique communication channels, wherein each second unique communication channel of the plurality of second unique communication channels is a private communication channel that facilitates encrypted communications between the first user account and a different user account not associated with the entity, and wherein each the second unique communication channel of the plurality of second unique communication channels is generated in response to the first user account confirming that a corresponding user account is approved to use the second unique communication channel;

adjusting the user interface to display the first unique communication channel and to provide access to the plurality of second unique communication channels;

continuously monitoring the first unique communication channel and the plurality of second unique communication channels to determine (i) when questions are posted by the first user account to the first unique communication channel and (ii) when a particular interest is expressed in one or more second unique communication channels of the plurality of second communication channels;

receiving, at the first unique communication channel and in at least one second unique communication channel of the plurality of second unique communication channels, and in response to the continuously monitoring, input data including a question posted by the first user account to the first unique communication channel using the user interface and a message relating to the question sent in the at least one second unique communication channel, wherein the question and the message indicate the particular interest; and automatically adjusting, by applying the artificial intelligence model to the first user account, the question, and the message to the artificial intelligence model, the first unique communication channel, wherein the adjusting comprising automatically rearranging the real-time communications presented on the first unique communication channel according to the particular interest.

16. The non-transitory computer-readable medium of claim 15, wherein the operations further comprise applying the artificial intelligence model to the first user account to generate the first unique communication channel by:

using the artificial intelligence model to determine one or more interests of an entity associated with the first user account; and generating the first unique communication channel by identifying a plurality of content associated with the one or more interests, wherein each content item of the plurality of content has a likelihood above a threshold of being associated with the one or more interests.

17. The non-transitory computer-readable medium of claim 15, wherein the operation of receiving the input data comprises receiving an indication that an entity of the first user account interacted with a particular type of content, wherein the operation of applying the artificial intelligence model to the first user account and the input data to adjust the first unique communication channel comprises applying a second weight to content of the particular type of content, and wherein the second weight is higher than a first weight originally associated with the particular type of content.

18. The non-transitory computer-readable medium of claim 15, wherein the operations further comprise applying the artificial intelligence model to the input data and the first user account to generate one or more recommendations for service to an entity associated with the first user account.

19. The non-transitory computer-readable medium of claim 18, wherein the operation of applying the artificial intelligence model to the input data and the first user account to generate one or more recommendations for service to an entity associated with the first user account comprises applying the artificial intelligence model to the input data and the first user account to determine one or more services to be included in the one or more recommendations, wherein the one or more services have one or more likelihoods for being used by the entity, and wherein each likelihood of the one or more likelihoods exceeds a threshold likelihood.

* * * * *